United States Patent [19]

Boyer

[11] Patent Number: 4,862,149
[45] Date of Patent: Aug. 29, 1989

[54] FAULT DISPLAY DEVICE FOR GYROSCOPIC INSTRUMENTS

[75] Inventor: Francis Boyer, Maurepas, France

[73] Assignee: Societe Francaise D'Equipments pour la Navigation Aerienne S.F.E.N.A., Velizy Villacoublay Cedex, France

[21] Appl. No.: 251,351

[22] Filed: Sep. 26, 1988

Related U.S. Application Data

[63] Continuation of Ser. No. 19,320, filed as PCT FR86/00181 on May 28, 1986, published as WO86/07140 on Dec. 4, 1986, now abandoned.

[30] Foreign Application Priority Data

May 28, 1985 [FR] France .................... 87 07964

[51] Int. Cl.⁴ ........................................... G08B 21/00
[52] U.S. Cl. ..................... 340/635; 340/975; 340/967; 73/178 R
[58] Field of Search ............... 340/670, 975, 967, 984, 340/635; 73/178 R, 178 H, 178 T; 74/5.7, 5.6 D, 5.6 R

[56] References Cited

U.S. PATENT DOCUMENTS

| | | | |
|---|---|---|---|
| 2,504,582 | 4/1950 | Pugin | 340/688 |
| 3,732,739 | 5/1973 | Catford et al. | 74/5.6 R |
| 3,807,238 | 4/1974 | Chombard | 74/5.7 |
| 3,851,324 | 11/1974 | De Boer et al. | 340/984 |
| 4,387,360 | 6/1983 | Jourdan et al. | 73/178 T |
| 4,419,832 | 9/1983 | Schmidt | 33/329 |
| 4,463,355 | 7/1984 | Schultz et al. | 73/178 R |
| 4,583,094 | 4/1986 | Mosier | 340/967 |
| 4,654,582 | 3/1987 | Ito | 73/178 R |

FOREIGN PATENT DOCUMENTS

| | | |
|---|---|---|
| 1113866 | 4/1956 | France . |
| 1412614 | 8/1965 | France . |
| 2068156 | 8/1971 | France . |

Primary Examiner—Joseph A. Orsino
Assistant Examiner—Jill D. Jackson
Attorney, Agent, or Firm—Browdy and Neimark

[57] ABSTRACT

Device for visualizing failures for gyroscopic instruments comprising, independently of the size of the indicator which incorporates it, an intuitive warning means accounting simultaneously for the supply of the liability and for the speed conformity of the gyroscope to the required values. It comprises two complementary display zones in the rolling dial (5 and 6) made up by means of elements of liquid crystals presenting an opaque appearance in the presence of a supply voltage and showing a color required in the absence of a supply voltage. One of the zones (5) is comprised of a single active element informing of the disappearance of the supply while the other zone (6) is comprised of a plurality of juxtaposed active elements, which are progressively switched and which give a synoptic perception of the speed reduction of the gyroscopic top of the instrument.

14 Claims, 2 Drawing Sheets

FIG.1
FIG.2
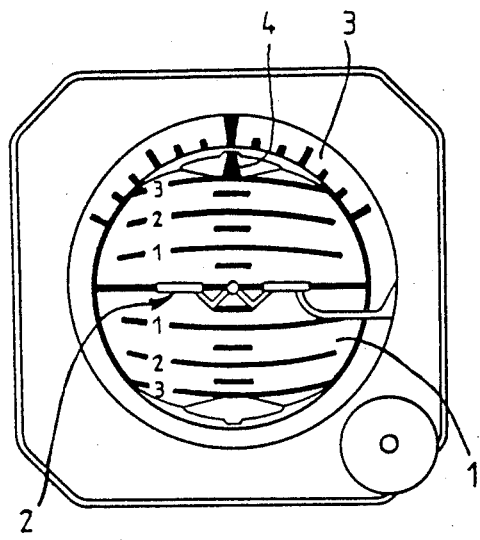
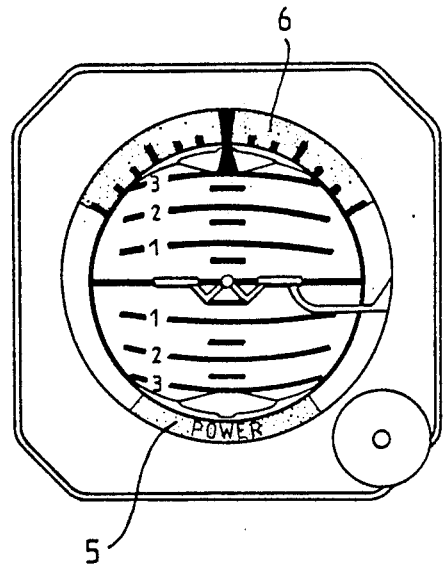
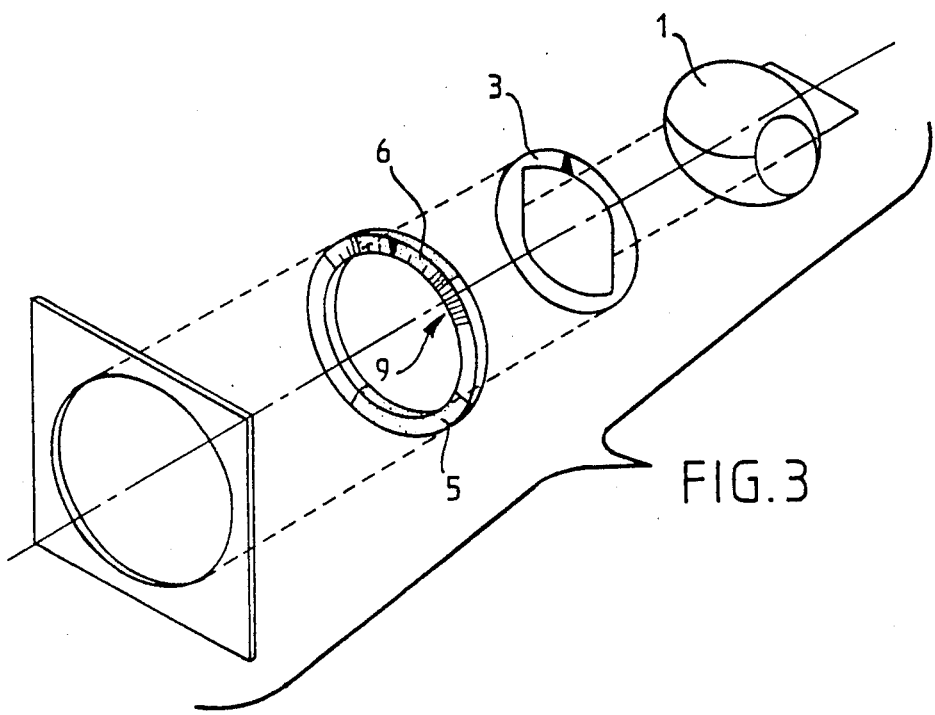
FIG.3

FAULT DISPLAY DEVICE FOR GYROSCOPIC INSTRUMENTS

This application is a continuation of application Ser. No. 19,320, filed as PCT FR86/00181 on May 28, 1986, published as WO86/07140 on Dec. 4, 1986, abandoned.

BACKGROUND OF THE INVENTION

1. Field of the Invention

The invention concerns a fault display device for gyroscopic instruments.

2. The Prior Art

There are known, from French patents 69.41186 and 2,135,861 in the name of the applicant, devices for showing the rotation speed of a gyroscope and of displaying it visually to an observer by means of a colored flap moved by a sensitive moving coil meter.

Such devices may be used in conjunction with other colored flaps indicating the presence or absence of a supply voltage at the terminals of the gyroscope or at an input point to a unit incorporating said gyroscope.

Advantages resulting from such association are described in the previously mentioned patent 2,135,861. However, implementing solutions of this type encounters problems with accommodating the control members, the amount of space swept out by their display devices generally being ill matched to the lack of space available within the indicators that incorporate them; these installation problems may be such, in the case of small indicators, that it proves impossible to integrate the speed indicator device, so rendering unavailable information of extreme utility in so-called "emergency" situations.

A usual type gyroscopic horizon indicator comprises an angle of pitch indicator drum 1, a representation 2 of the aircraft and a fixed roll indication dial 3 with conventional graduation markings relative to which moves a roll pointer 4. Note that the fixed and moving roll indicators may be interchanged, as is sometimes necessary, or moved to the bottom of the instrument (see FIG. 1 in the appended drawings).

In a conventional solution to the alarm indication problem the arrangement as described above is disrupted by the provision, in the pilot's field of view and by means of electro-mechanical devices, of one or two brightly colored (red, for example) flaps.

As has previously been said, it is often difficult to incorporate these solutions and sometimes impossible in the case of the second flap, because of the constraints with regard to available space that these electromechanical devices entail.

Also, and still because of mechanical constraints, the area on the display where these flaps may be caused to appear is not always the optimum one, that is as near as possible the indication concerned.

SUMMARY OF THE INVENTION

An objective of the present invention is to make it possible to install systematically and irrespective of the size of the indicator that incorporates it an intuitive warning device responsive simultaneously to availability of the power supply and conformity of the gyroscope speed to the required values.

The present invention substitutes for the conventional electromechanical solution an electro-optical solution exploiting otherwise known properties of certain liquid crystals.

The specific liquid crystals considered here are opaque when subjected to a control voltage and take on a distinctive coloration when the control voltage is removed.

Their effect may be accentuated by the use of integral or external lighting devices.

Using methods specific to the liquid crystal display technology, it is possible to obtain simple or complex markings (letters, symbols) that are switchable or not (external silkscreened markings, for example). These various possibilities are exploited for a specific arrangement of the aircraft gyroscopic instrument, so offering enhanced quality of operation for this type of instrument.

It should be noted that the electro-optical solution proposed by this invention to the problem of the two-fold alarm indication is designed for minimum disturbance to the architecture of the conventional instrument, since it may be limited to a slight increase in the thickness of the fixed roll indicator dial that is already present.

The invention is more particularly directed to a fault display device for gyroscopic instruments comprising a reduced speed alarm and a loss of power alarm, characterised in that the two alarms are ergonomically associated, the device comprising two complementary display areas in the roll indicator dial, one comprising a single active element to indicate failure of the power supply and the other consisting of a set of juxtaposed active members switched progressively to give a synoptic indication of the reduced speed of the gyroscopic rotor of the instrument.

The invention represents a further development of liquid crystal technology, especially liquid crystals that are opaque when a supply voltage is present and expose a required colour in the absence of the supply voltage, extending this application to a progressive, intuitive and fast display, so as to draw this synoptic view of the reduced speed of the gyroscopic rotor to the attention of a user constantly called upon to execute multiple tasks.

BRIEF DESCRIPTION OF THE DRAWINGS

Other characteristics and advantages of the present invention will emerge from the following description given with reference to the appended drawings, in which:

FIG. 1 is a front view of the "faceplate" of a usual type gyroscopic horizon indicator showing the image as seen by the pilot in normal operation;

FIG. 2 is a front view of the "faceplate" of a gyroscopic horizon indicator in accordance with the invention;

FIG. 3 is an exploded view in perspective of a device in accordance with the invention showing the position of the display means.

DETAILED DESCRIPTION OF THE PREFERRED EMBODIMENTS

Figure 4:
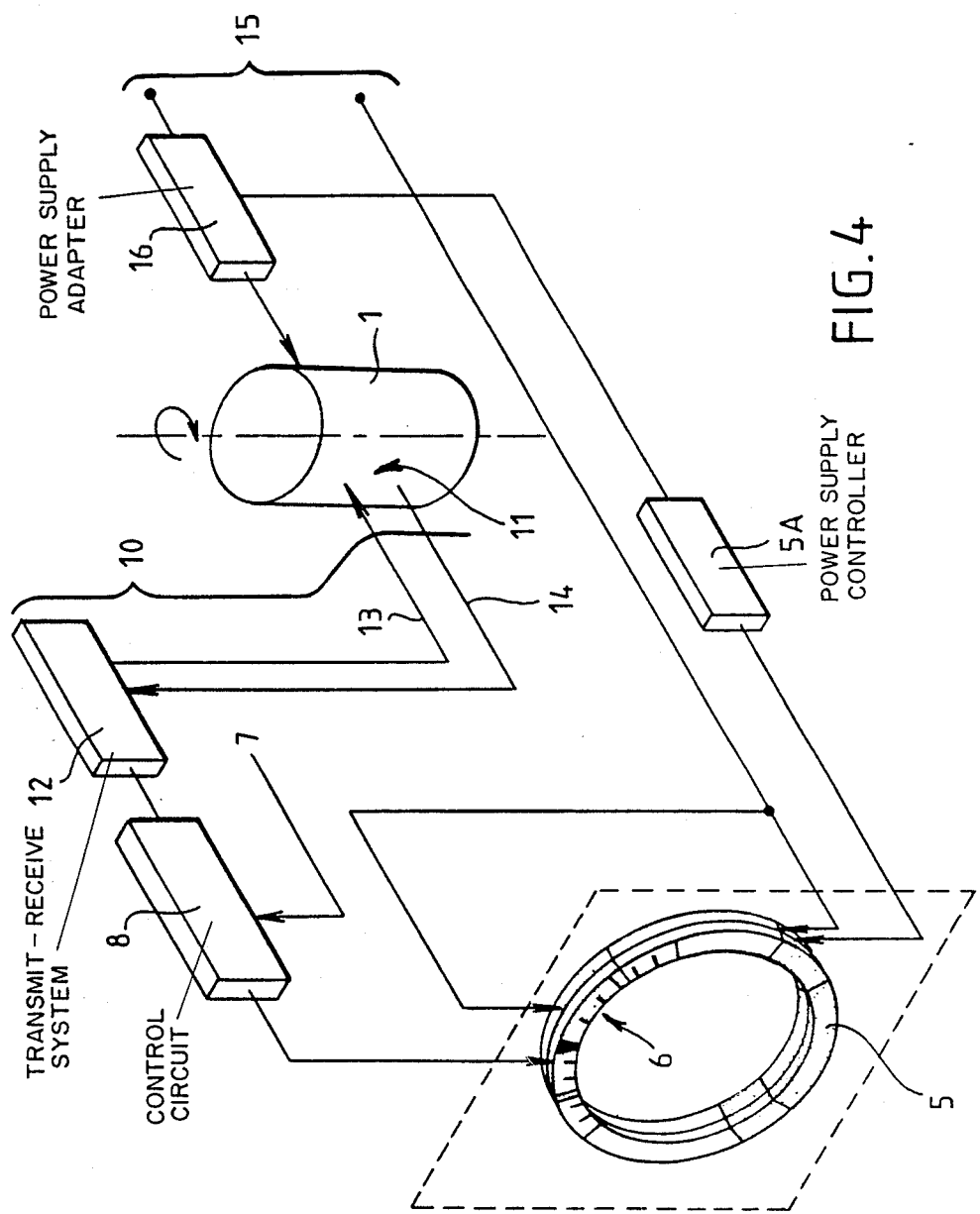
FIG. 4 is a block diagram showing the electrical principle of the device.

In the embodiment of a "faceplate" in accordance with the invention shown in FIG. 2, which may be applied to a drum indication type gyroscopic horizon indicator, as described in French patent 1.412.614, or to a plane indication type horizon indicator, as described in U.S. Pat. No. 4.419.832, the lower part of the roll indicator dial features a colored area 5 indicating failure of the power supply to the gyroscope rotor. This colored area 5 may be implemented in the form of a single active liquid crystal member, using a threshold type power supply controller 5A (FIG. 4).

In the upper part is another coloured area 6 (also of the liquid crystal type) disposed under the roll indications and which can lengthen progressively as the speed decreases, offering the pilot a graded but readily grasped view of the situation.

Another characteristic of the device in accordance with the invention is that, depending on user requirements, the lengthening of the colored indication (6), for example a progressive reddening proportional to the loss of speed, may be limited to a precise sector of the roll dial (90°, for example) or extended as far as the area 5, so forming a complete circle should the speed drop to a value insufficient for safety.

This operational choice (precise angle or complete circle) is obtained without any structural modification by means of an electronic adjustment 7 to a control circuit 8 immediately the complete circuit is introduced (FIG. 4).

In accordance with the invention, to achieve the progressive reddening of the roll dial, this is made up of a series of independent elementary patterns 9 which are disconnected one after the other as the speed decreases, so exposing the required color under the elements disconnected (to make the drawing clear only certain of these patterns have been shown in FIG. 3). In other words, these elementary patterns or juxtaposed active members 9 are opaque when a voltage is fed to them, thus covering from sight the red color disposed underneath the patterns 9. When the voltage to the patterns is reduced, one by one, symmetrically around the 0 mark on the roll dial, these patterns are switched or disconnected, thus becoming transparent and exposing the red color underneath.

This progressive control is implemented by the control circuit 8 which is a conventional electronic circuit switching symmetrically relative to 0 and proportionally to the decrease in the measuring voltage. This measuring voltage may be produced by a device such as that described in the previously mentioned patent 2,135,861 or, and advantageously, by an electro-optical sensor 10 viewing an area 11 having light and dark portions creating voltages which reflect the speed, this area being disposed at the periphery of the gyroscope 1 (FIG. 4) as disclosed in U.S. Pat. No. 3,732,739.

The electro-optic speed sensor 10 consists of a transmit-receive system 12 using light-emitting diodes, modulated at a high frequency, an optical fiber 13 conveying the modulated light to the periphery of the gyroscope rotor, by means of an opening formed in the gyroscope bowl, and an optical fiber 14 for recovering the reflected energy.

A so-called "amplification and shaping" circuit applies the necessary corrections for correct functioning of the progressive control circuit 8.

The general power supply is shown at 15 followed by a power supply adapter device 16 one branch of which is connected to the threshold type controller 5A of the color area 5.

It is to be understood that the present invention has been described and shown by way of preferred example only and that equivalents may be substituted for its component parts without departing from the scope of the present invention.

Thus the curvilinear representation (area 6) of the progressive speed alarm may be replaced with a linear representation, or a representation of any other kind, if necessary to enhance the ergonomics of the product incorporating it; likewise, the main roll dial may be subdivided into associated elements to facilitate the exploitation of the invention without departing from the scope thereof.

I claim:

1. Fault display device for gyroscopic instruments comprising a roll indicator, a reduced gyroscope rotor speed alarm and a power failure alarm, the device comprising at least one display area on the roll indicator, the at least one area comprising a set of juxtaposed active members switched progressively, to give a synoptic view of the reduced speed of the gyroscopic rotor of the instrument.

2. Fault display device according to claim 1 wherein the active members comprise liquid crystal devices having an opaque appearance when a supply measuring voltage supplied to the liquid crystal devices is present and becoming selectively transparent to expose a required color when the supply measuring voltage is reduced.

3. Fault display device according to claim 2, wherein the liquid crystal devices comprise any form of internal or external symbols.

4. Fault display device according to claim 1, wherein the speed is sensed by electro-optical sensing means.

5. Fault display device according to claim 4, wherein the electro-optical means comprises a modulated light transmission-reception system, an optical fiber conveying the light to the periphery of the gyroscope rotor and an optical fiber recovering the reflected light energy.

6. Fault display device according to claim 4, wherein the electro-optical speed sensing means are facing a reflective area situated at the periphery of the gyroscope rotor.

7. Fault display device according to claim 6, wherein the electro-optical means comprises a modulated light transmission-reception system, an optical fiber conveying the light to the periphery of the gyroscope rotor and an optical fiber recovering the reflected light energy.

8. Fault display device for gyroscopic instruments comprising a roll indicator, a reduced gyroscope rotor speed alarm and a power failure alarm, the device comprising two complementary display areas on the roll indicator, a first display area consisting of a single active member to indicate power supply failure, a second display area consisting of a set of juxtaposed active members switched progressively to give a synoptic view of the reduced speed of the gyroscopic rotor of the instrument.

9. Fault display device according to claim 2, wherein the second display area and the first display area can join up according to the requirements of the user responsive to means for adjusting the extent of the second display area.

10. Fault display device according to claim 8, wherein the second display area and the first display area can join up according to the requirements of the user responsive to means for adjusting the extent of the second display area.

11. Fault display device according to claim 9 wherein the display areas are implemented by means of liquid crystal devices having an opaque appearance when a supply measuring voltage supplied to the liquid crystal devices is present and becoming selectively transparent to expose a required color when the supply measuring voltage is reduced.

12. Fault display device according to claim 8, wherein the speed is sensed by electro-optical sensing means.

13. Fault display device according to claim 12, wherein the electro-optical speed sensing means are facing a reflective area situated at the periphery of the gyroscope rotor.

14. Fault display device according to claim 12, wherein the electro-optical means comprises a modulated light transmission-reception system, an optical fiber conveying the light to the periphery of the gyroscope rotor and an optical fiber recovering the reflected light energy.

* * * * *